United States Patent
Vollmer

(10) Patent No.: US 8,378,541 B2
(45) Date of Patent: Feb. 19, 2013

(54) MAGNETIC RADIAL BEARING AND MAGNETIC BEARING SYSTEM HAVING A THREE-PHASE CONTROLLER

(75) Inventor: Rolf Vollmer, Gersfeld (DE)

(73) Assignee: Siemens Aktiengesellschaft, München (DE)

(*) Notice: Subject to any disclaimer, the term of this patent is extended or adjusted under 35 U.S.C. 154(b) by 713 days.

(21) Appl. No.: 12/505,882

(22) Filed: Jul. 20, 2009

(65) Prior Publication Data

US 2010/0013332 A1    Jan. 21, 2010

(30) Foreign Application Priority Data

Jul. 21, 2008    (EP) .................................. 08013120

(51) Int. Cl.
*H02K 7/09*    (2006.01)
*H02K 11/00*   (2006.01)
*H02K 41/00*   (2006.01)

(52) U.S. Cl. .................. 310/90.5; 310/68 D; 310/68 R; 318/135

(58) Field of Classification Search ............... 310/68 D, 310/68 R, 90.5; 318/135, 254
See application file for complete search history.

(56) References Cited

U.S. PATENT DOCUMENTS

| 3,895,274 A * | 7/1975 | Chin ............................... 318/811 |
| 4,348,606 A * | 9/1982 | Hibino ........................... 310/184 |
| 4,459,502 A * | 7/1984 | El-Antably .................... 310/184 |
| 5,237,229 A   | 8/1993 | Ohishi |
| 6,365,996 B2* | 4/2002 | Schob .......................... 310/90.5 |

FOREIGN PATENT DOCUMENTS

| DE | 2358527 A1 | 5/1975 |
| DE | 19852460 A1 | 5/2000 |
| DE | 102006026402 A1 | 12/2007 |
| EP | 0836022 A1 | 4/1998 |
| EP | 0845084 A1 | 6/1998 |
| EP | 1863168 A2 | 12/2007 |
| GB | 1478668 A | 7/1977 |
| WO | WO 97/07341 | 2/1997 |
| WO | WO 2005121580 A1 | 12/2005 |
| WO | WO 2006058871 A2 * | 6/2006 |

OTHER PUBLICATIONS

Machine Translation WO2006058871 (2006).*

* cited by examiner

*Primary Examiner* — Quyen Leung
*Assistant Examiner* — Jose Gonzalez Quinones
(74) *Attorney, Agent, or Firm* — Henry M. Feiereisen LLC

(57) ABSTRACT

A magnetic radial bearing and a bearing system for supporting a rotating shaft are disclosed. The bearing has a number of electromagnets circumferentially arranged around a rotating shaft. Each of the electromagnets has a coil which is electrically connected so as to generate both a magnetic bias and a rotating three-phase field. First terminals of opposing coils are connected in common to a corresponding phase of a three-phase controller for generating the rotating field, whereas second terminals of the coils not connected to the same phase are connected at corresponding star points. The star points are connected to DC power for generating the magnetic bias.

10 Claims, 6 Drawing Sheets

MAGNETIC RADIAL BEARING AND MAGNETIC BEARING SYSTEM HAVING A THREE-PHASE CONTROLLER

CROSS-REFERENCES TO RELATED APPLICATIONS

This application claims the priority of European Patent Application, Serial No. EP 08013120, filed Jul. 21, 2008, pursuant to 35 U.S.C. 119(a)-(d), the content of which is incorporated herein by reference in its entirety as if fully set forth herein.

BACKGROUND OF THE INVENTION

The invention relates to a magnetic radial bearing having electromagnets which are arranged distributed in the circumferential direction. Bearings of this type are also referred to as active magnetic bearings or active magnet bearings. The invention also relates to a magnetic bearing system which has a magnetic radial bearing of the aforementioned type as well as a three-phase controller for rotating field excitation and a DC supply for the magnetic bias excitation. The three-phase controller is preferably a converter.

The following discussion of related art is provided to assist the reader in understanding the advantages of the invention, and is not to be construed as an admission that this related art is prior art to this invention.

To ensure clarity, it is necessary to establish the definition of several important terms and expressions that will be used throughout this disclosure. The term "radial" refers to a direction toward and away from a rotation axis of the supported rotor shaft. The term "axial" refers to a direction parallel to the rotation axis. The term "in the circumferential direction" refers to tangential directions around the rotation axis of the rotor shaft. When the bearing for the rotor shaft is in use, the rotation axis of the rotor shaft actually corresponds to a structural rotation axis and to a rotational axis of symmetry of the magnetic radial bearing.

Conventional magnetic radial bearings have been previously disclosed which include six-electromagnets which are offset by 60° in the circumferential direction, thus representing a rotating-field machine stator with a three-phase winding. At least one additional coil is provided to produce the magnetic bias. The electromagnets are connected in star or delta to a three-phase controller.

Bearings of this type are intended for a non-contact, wear-free bearing of a rotor shaft of a rotating machine. The machines under consideration may have a mass of more than one ton and an electrical rating of more than 500 kW, or even several Megawatts. Machines of this type are, for example, electric motors, generators, turbomachines, compressors, pumps and the like. They may have a maximum rotation speed of 4000 rpm or more. During use, an air gap preferably in the range from 0.3 mm to 0.5 mm is maintained between the magnetic radial bearing and the supported rotor shaft.

It would therefore be desirable and advantageous to provide an improved magnetic radial bearing, which obviates prior art shortcomings and specifically has an otherwise comparable bearing characteristics and a simpler winding design. It would also be desirable to provide a magnetic bearing system with a magnetic radial bearing of this type.

SUMMARY OF THE INVENTION

According to one aspect of the invention, a magnetic radial bearing includes a plurality of electromagnets arranged in a circumferential direction around a rotating shaft. Each of the electromagnets has a coil electrically connected so as to be able to generate both a magnetic bias and a rotating three-phase field. Opposing coils of the plurality of coils form coil pairs, with first terminals of each coil pair connected in common to a corresponding phase of a three-phase controller for generating the rotating field. Second terminals of coils of each coil pair associated with different phases are connected at corresponding star points, with the star points connected to DC power for generating the magnetic bias.

A benefit of the invention is that, in comparison to the prior art, only a single coil instead of two coils is required for each electromagnet. This simplifies the winding design of the magnetic radial bearing according to the invention considerably, both with respect to the circuitry and with respect to the winding complexity. A radial bearing of this type can advantageously be designed in a more compact form by the use of only a single coil for each electromagnet.

According to another advantageous feature of the present invention, the magnetic radial bearing may have a number of phase connections corresponding to the number of phases, as well as two connections to produce the magnetic bias. If there are a total of three phases, then the radial bearing has three phase connections and two magnetic bias connections. In other words, the radial bearing according to the invention can be connected via five electrical connections to a three-phase controller and a DC supply, respectively. Alternatively, the parallel coil ends as well as the two star points can be connected to the three-phase controller and to the DC supply via longer electrical connecting lines.

According to another advantageous feature of the present invention, the electromagnets may be in the form of a rotating-field machine stator with a three-phase winding. In this case, the three-phase winding is inserted or wound into appropriate stator slots in the magnetic radial bearing. This results in a particularly compact magnetic radial bearing.

According to yet another advantageous feature of the present invention, the rotating-field machine stator can be wound such that a number of pole pairs $p_v$ for magnetic bias and a number of pole pairs $p_D$ of the rotating field differ by the value 1. By presetting the phase angle of the applied rotating field, a magnetic two-pole field wave, acting in the circumferential direction, can advantageously be set for regulating the position of the rotor shaft. The number of pole pairs $p_v$ of the magnetic bias field and the number of pole pairs $p_D$ of the three-phase rotating field can be predetermined by winding the rotating-field machine stator accordingly.

According to another advantageous feature of the present invention, the three-phase stator winding may have a number of holes q=2/5. The number of holes is in this case the quotient of the number of stator slots divided by the number of phases, as well as the number of electromagnetic poles which are produced by the rotating field.

According to another advantageous feature of the present invention, the rotating-field machine stator may have twelve stator slots. The magnetic bias field then has a total of six-pole pairs $p_v$, and the three-phase rotating field has a total of five pole pairs $p_D$ for corresponding excitation by a connected three-phase controller. A magnetic radial bearing of this type has advantageously a very simple and extremely compact construction.

According to still another advantageous feature of the present invention, the ratio of an internal diameter of the magnetic radial bearing to its axial length may range from 0.3 to 2, preferably from 0.8 to 1.25. In particular applications, the ratio may also be smaller, for example 0.2, or greater, for example 5.

According to another aspect of the invention, a magnetic bearing system includes a magnetic radial bearing according to the invention, and in addition a three-phase controller for rotating field excitation and a direct-current (DC) supply for the magnetic bias excitation. A system of this type may be produced to be particularly compact and at particularly low cost by using a conventional three-phase controller and of a compact radial bearing which can be implemented particularly easily with the invention. The DC supply may be galvanically isolated from the three-phase controller.

According to another advantageous feature of the present invention, the three-phase controller may have an input-side DC link circuit and a downstream inverter unit. Currently preferred is the implementation of the inverter unit as a three-phase unit. The DC power may be supplied via the DC link circuit of the three-phase controller. The integration of the DC supply in the three-phase controller, preferably in the converter, once again simplifies the design of the magnetic bearing system according to the invention. The DC supply can be connected directly to the DC link circuit of the three-phase controller. Alternatively, a DC/DC converter can be connected to the DC link circuit, permitting a galvanically isolated, or floating, DC supply.

The DC supply according to another embodiment of the magnetic bearing system may include a pulsed switching means, in particular a chopper, to set a magnetic bias current. This makes it possible to set predetermined current values for the magnetic bias current.

In addition, the magnetic bearing system may include a position sensor for detecting the position of a rotor shaft which is to be magnetically supported in the x- and y-directions. It also includes a control unit having drive means for the three-phase controller for rotating field excitation of the magnetic radial bearing such that a position of the rotor shaft can be predetermined in the x- and y-directions. The control unit preferably has regulation means such that an actual value which is detected by the position sensor of the x- and y-directions of the rotor shaft corresponds to the predetermined nominal value. This allows the rotor shaft to be supported with great precision. The control unit is preferably integrated in the three-phase controller. The position sensor is, in particular, designed for non-contact position detection. The detection may be based, for example, on optical or magnetic means.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
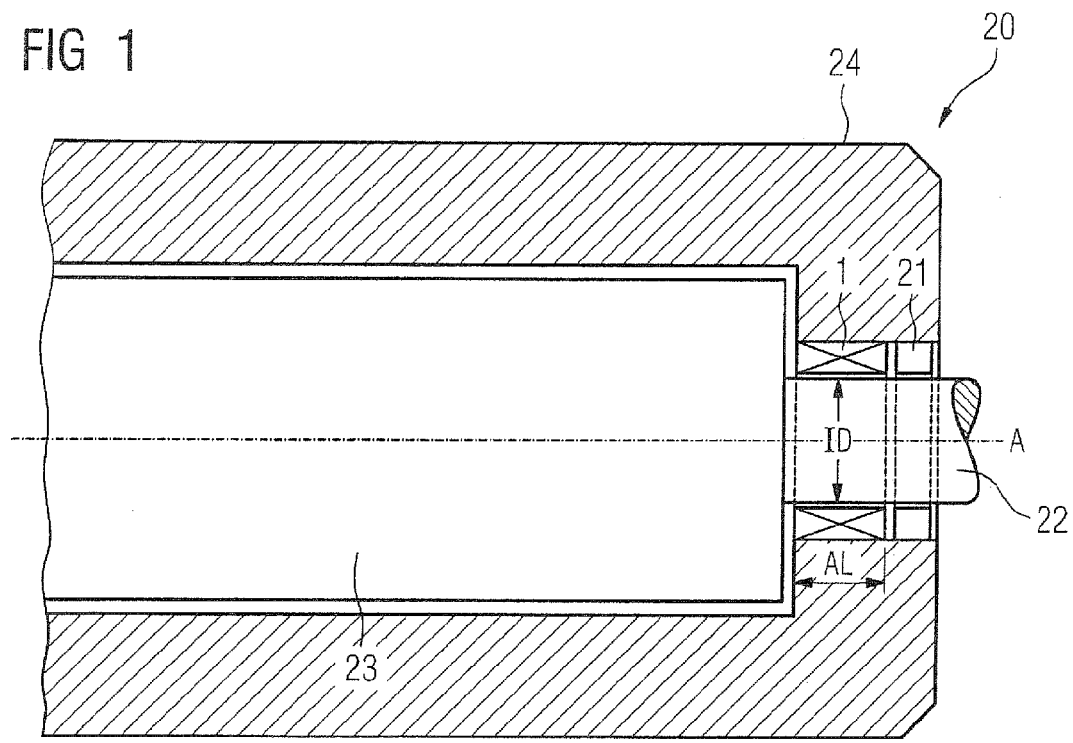
FIG. 1 shows an example of a rotating machine having a rotor shaft which is supported in a magnetic radial bearing.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary rotating machine 20 having a rotor shaft 22 which is supported in a magnetic radial bearing 1. In the present example, the rotating machine 20 is an electric motor having a rotor 23, which is seated on the rotor shaft 22, and a stator 24. The rotating machine 20 may alternatively be, for example, a pump, a compressor, a spindle or some other rotating machine 20. Currently preferred is the implementation of the rotating machines 20 as turbomachines. Furthermore, the machine 20 has a holding bearing 21 for holding the rotor shaft 22 in the event that the power for the magnetic radial bearing 1 fails. The reference symbol A denotes a rotation axis of the rotor shaft 2, AL denotes an axial length of the magnetic radial bearing 1, and ID denotes an internal diameter of the radial bearing 1. In the present example, the ratio of the internal diameter ID to the axial length AL is, by way of example, about 1.5.

Figure 2:
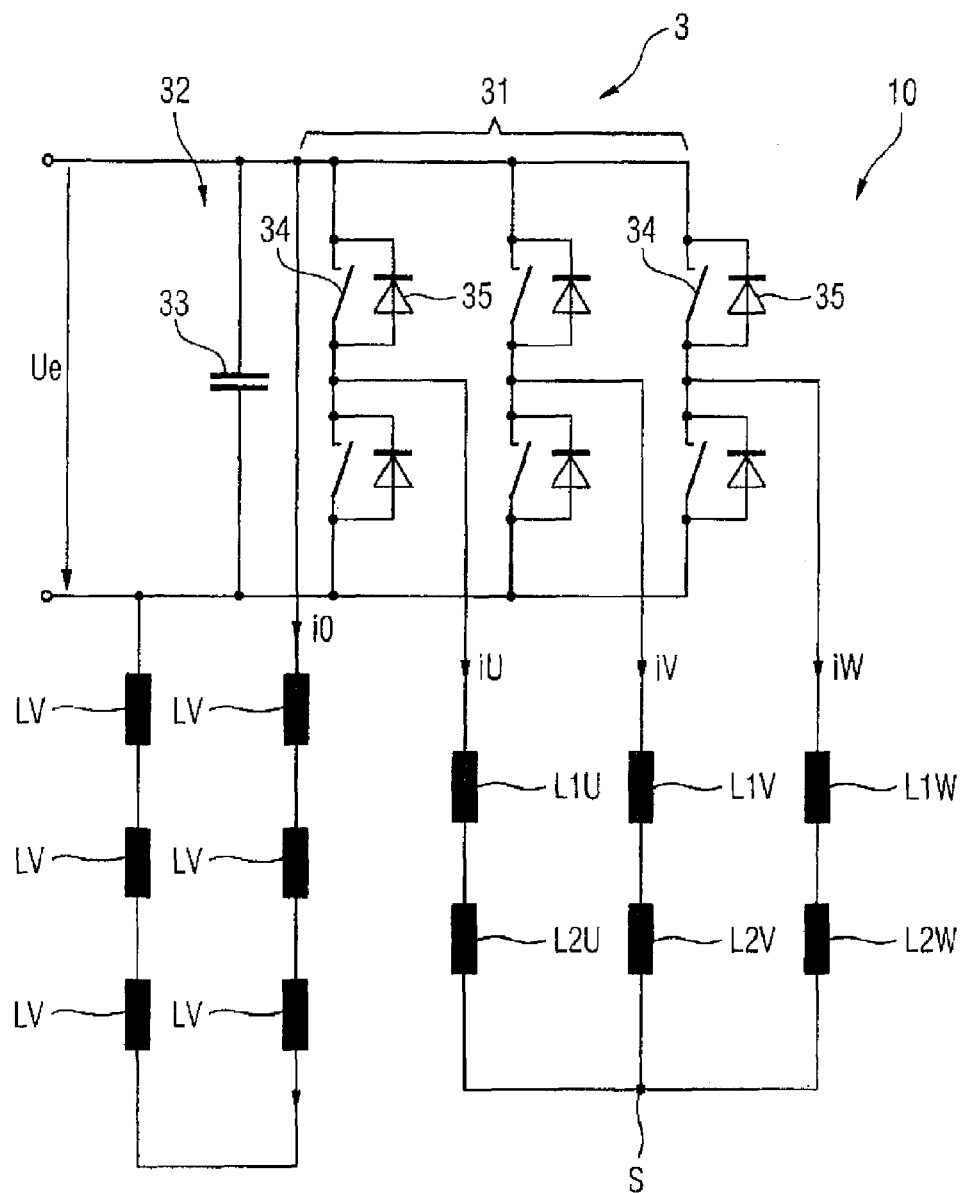
FIG. 2 shows an electrical circuit having a three-phase controller for driving a magnetic radial bearing which comprises six electromagnets, according to the prior art.

FIG. 2 shows a conventional electrical circuit having a three-phase controller 3 for driving a magnetic radial bearing 1 with six-electromagnets. The circuit diagram of FIG. 2 shows only the six-associated coils L1U, L2U, L1V, L2V, L1W, L2W, with two coils L1U, L2U; L1V, L2V; L1W, L2W being connected in series for a respective one of the three phases U, V, W, and being connected to a star point S. The three illustrated phases are supplied with the phase currents iU, iV, iW on the converter side.

In the depicted example, the three-phase controller 3 is a converter having an input-side DC link circuit 32 and a downstream inverter unit 31 in a so-called full-bridge circuit. The reference symbol 34 denotes the switching means, which can be driven on a clocked basis, in particular power transistors. Reference symbol 35 denotes freewheeling diodes. A DC link circuit capacitor 33 is provided for buffering an input DC voltage Ue which is applied on the input side. A series circuit comprising six-magnetic bias coils LV is also connected in parallel with the voltage DC link circuit 32. The DC link circuit 32 produces a magnetic bias current i0 which flows through this series circuit. The electromagnets, which are not illustrated in this illustration itself, each have one of the right-hand coils L1U, L2U, L1V, L2V, L1W, L2W and a respective magnetic bias coil LV. The illustrated magnetic bearing system consequently requires twelve coils for the arrangement with six-electromagnets.

Figure 3:
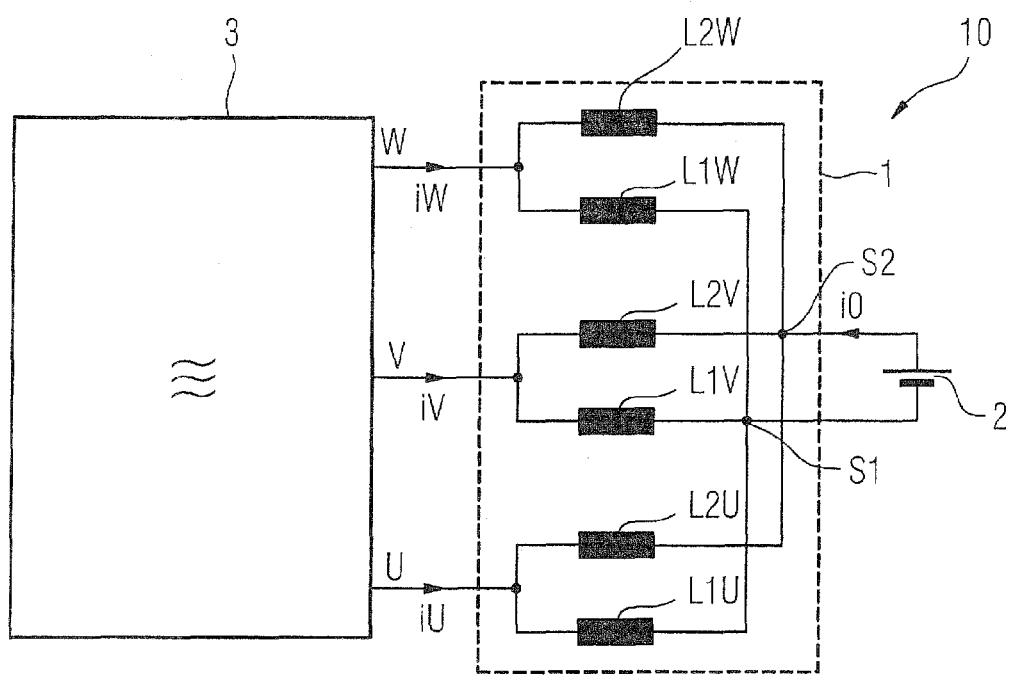
FIG. 3 shows an example of a magnetic bearing system having a three-phase controller and a magnetic radial bearing with coil circuitry according to the invention.

FIG. 3 shows an example of a magnetic bearing system 10 according to the invention, with a three-phase controller 3 and a magnetic radial bearing 1 with coil circuitry. The illustrated magnetic radial bearing 1 has electromagnets $1u$, $2u$; $1v$, $2v$; $1w$, $2w$ which are arranged distributed in the circumferential direction, radially opposite and preferably in pairs, with these electromagnets being arranged offset through 60° in the circumferential direction. According to the invention, the electromagnets 1u, 2u; 1v, 2v; 1w, 2w each have a common coil L1u, L2u; L1v, L2v; L1w, L2w for producing the magnetic bias and the rotating magnetic field. As can be seen immediately, in comparison to the solution according to the prior art, only half the number of coils are advantageously required. In this case, a first and a second half of the coils L1u, L1v, L1w; L2u, L2v, L2w are in each case connected together at a star point S1, S2. These two star points S1, S2 are intended, according to the invention, for connection to a DC supply 2 for magnetic bias excitation. The remaining coil ends are intended for connection in parallel to a three-phase controller 3, which corresponds to the number of phases U, V, W of the rotating field, for rotating field excitation. The two star points S1, S2 are connected via connecting lines, which are not shown in detail, to electrical magnetic bias connections 7, 8. A DC supply 2, symbolized by the circuit symbol of a battery, is connected via these connections 7, 8 in order to feed in a magnetic bias current i0. On the left-hand side of FIG. 4, the number of phase connections 4, 5, 6 is shown to correspond to the number of phases, such as three phases for the present example. These connections 4, 5, 6 are connected via connecting lines, which are not shown in detail, to the coil ends of the first half, illustrated in the right-hand lower part, of the coils L1u, L1v, L1w of the three electromagnets 1u, 1v, 1w. In parallel with this, the coil ends of the coils L2u, L2v, L2w of the three electromagnets 2u, 2v, 2w which are shown in the left-hand upper part are connected to the phase connections 4, 5, 6 via connecting lines which are also not shown in detail.

Figure 4:
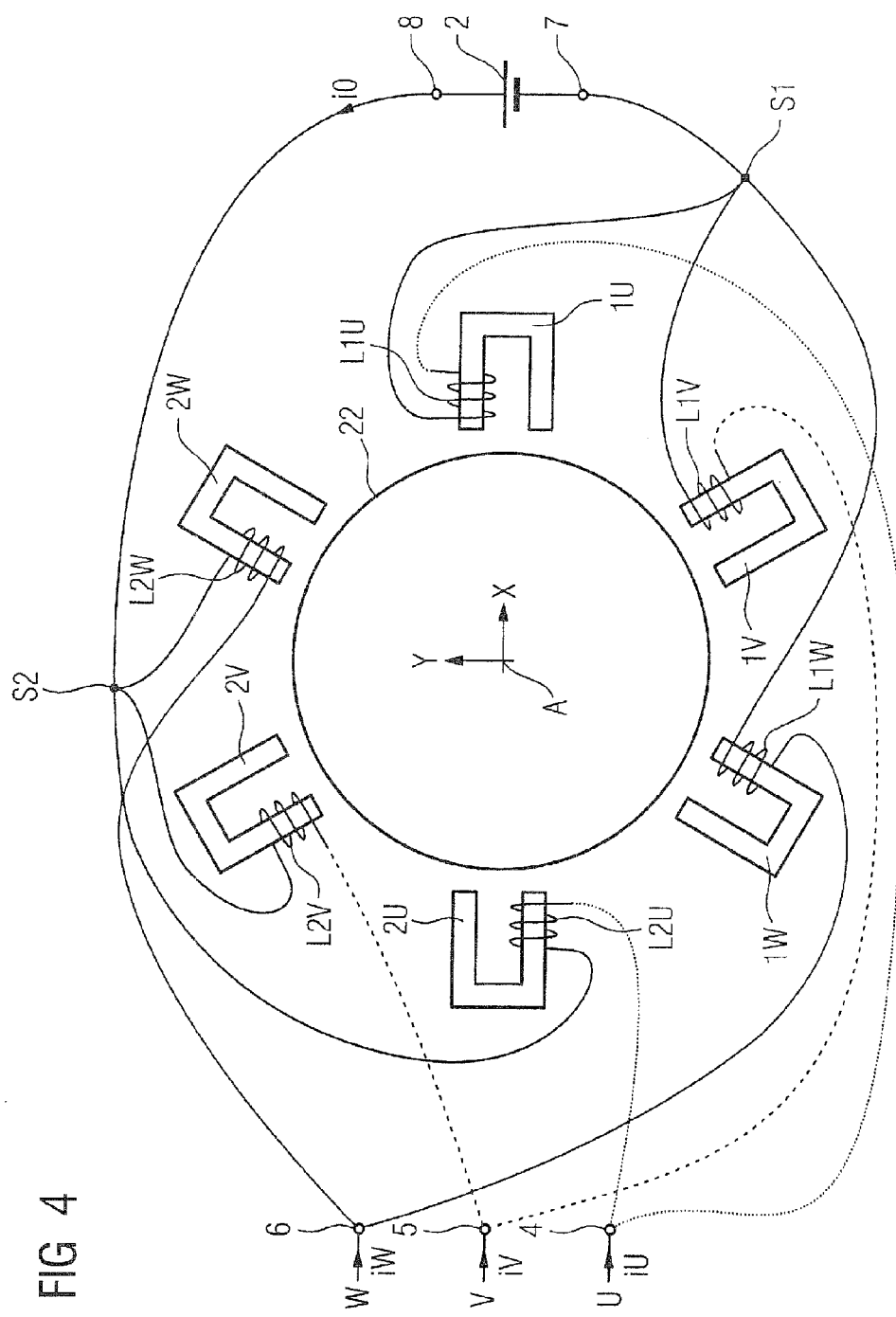
FIG. 4 shows a side view of the magnetic radial bearing shown in FIG. 3.

FIG. 4 also shows that the coils L1u, L2u; L1v, L2v; L1w, L2w of in each case two mutually opposite electromagnets 1u, 2u; 1v, 2v; 1w, 2w each have phase current components iU, iV, iW, which are not referred to in detail, flowing through them, as a result of which the magnetic fields caused by a preferably constant magnetic bias current i0 are on the one hand amplified and on the other hand attenuated, depending on the phase angle of the supply phase currents iU, iV, iW. In other words, the illustrated rotor shaft 22 is drawn closer in one direction than in the other direction, depending on the phase angle. The three-phase controller itself which is provided for supplying the respective phase currents iU, iV, iW is not shown in this figure. In order to assist understanding, an x-direction as well as a y-direction x, y for the possible radial movements of the rotor shaft 22 are shown in the inner area of the rotor shaft 22.

The electromagnets 1u, 2u; 1v, 2v; 1w, 2w are preferably in the form of a rotating-field machine stator with a three-phase winding. In this case, a stator of this type has a multiplicity of stator slots in which the three-phase winding is inserted. A rotating-field machine stator of this type is preferably wound such that a number of pole pairs $p_v$ for the magnetic bias and a number of pole pairs $p_D$ of the rotating field differ by the value 1.

A particularly compact magnetic radial bearing 1 can be obtained if the three-phase winding has a number of holes q=2/5. This can be achieved, for example, by means of a rotating-field machine stator with twelve stator slots, into which a corresponding three-phase winding is inserted, with the radial magnetic field which is produced by the three-phase winding having a total of five pole pairs $p_D$ in comparison to a magnetic bias field with a total of six-pole pairs $p_v$.

Figure 5:
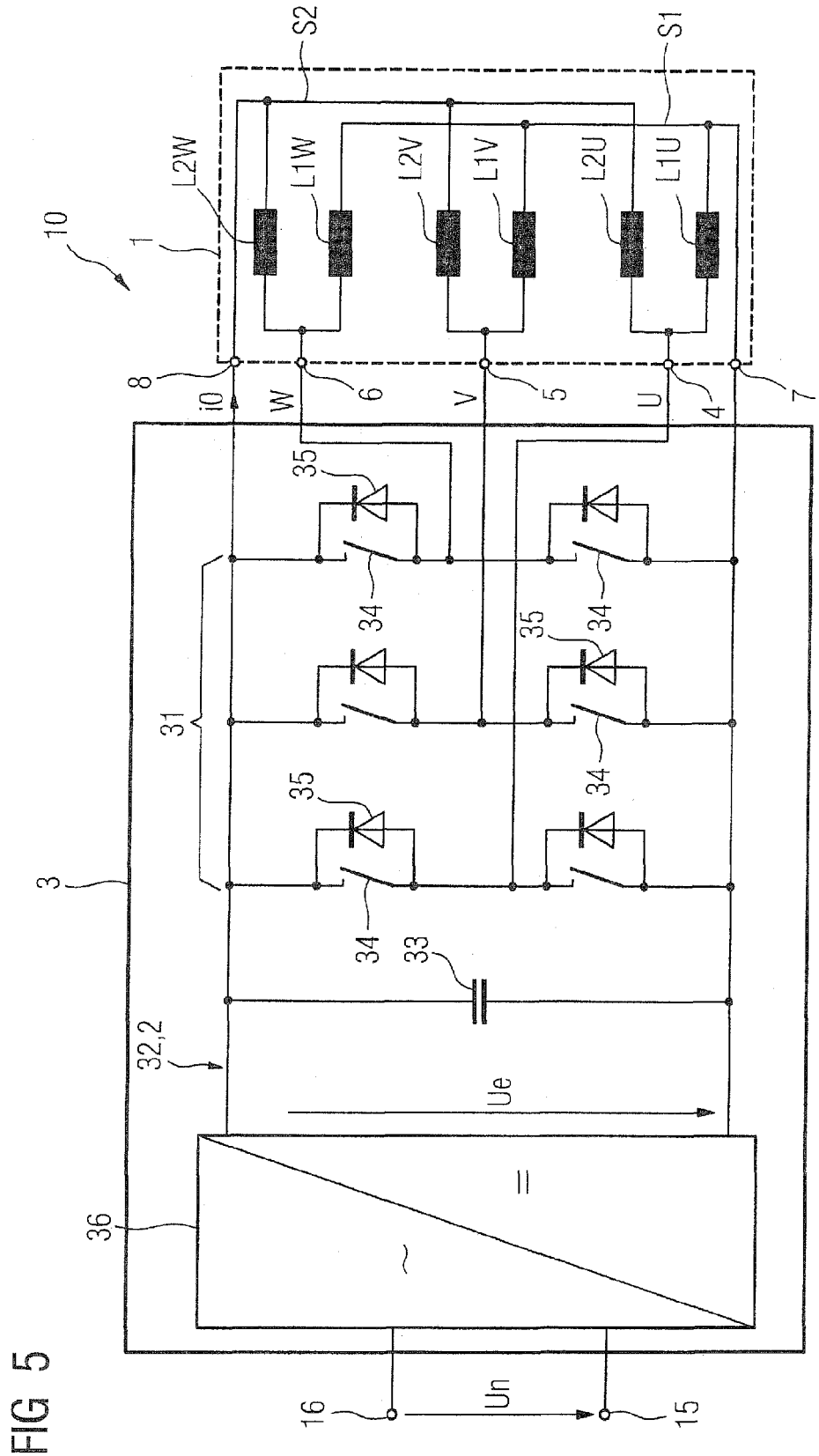
FIG. 5 shows a first embodiment of a magnetic bearing system according to the invention.

FIG. 5 is a first embodiment of a magnetic bearing system 10 according to the invention. In the left-hand part of FIG. 5, it has a three-phase controller 3 in the form of a converter, and on the right-hand side it has a connected magnetic radial bearing 1. This diagram of the circuitry also shows the circuitry according to the invention of the six-coils L1U, L2U; L1V, L2V; L1W, L2W at two star points S1, S2. According to the invention, the magnetic bias current i0 is supplied via the DC link circuit 32 of the three-phase controller 3. In other words, the DC link circuit 32 acts as the DC supply 2 for excitation of the magnetic bias in the magnetic radial bearing 1. By way of example, the DC link circuit 32 is preceded by a rectifier unit 36, which produces a rectified input DC voltage Ue for the DC link circuit 32 from an input AC voltage Un, for example a mains voltage of 230 V. Reference numerals 15, 16 denote the associated end connections of the three-phase controller 3.

Figure 6:
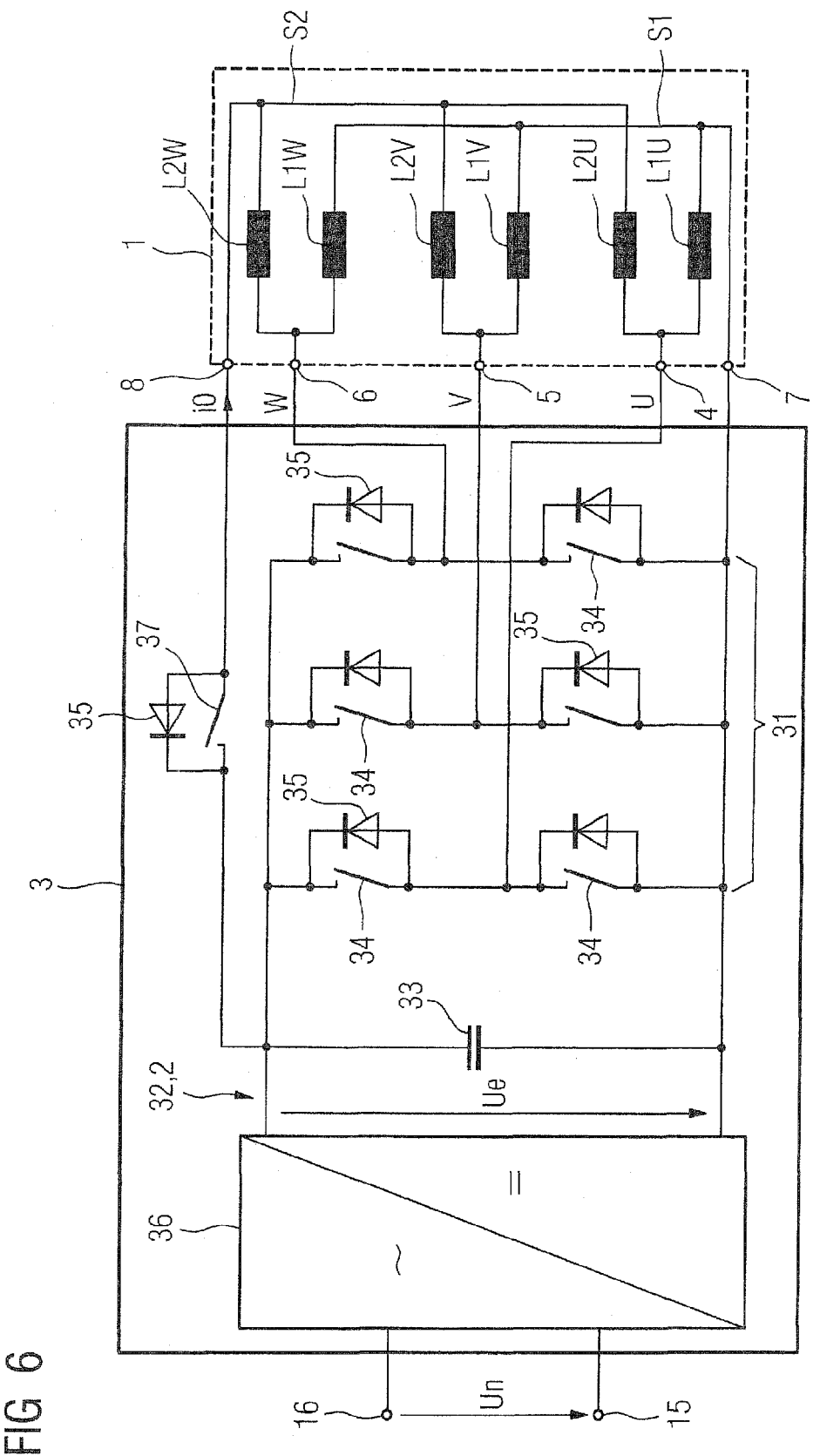
FIG. 6 shows a second embodiment of a magnetic bearing system according to the invention.

FIG. 6 shows a second embodiment of a magnetic bearing system 10 according to the invention. In this case, the DC supply 2 has pulsed switching means, in particular a chopper, for setting the magnetic bias current i0. By suitably clocking the switching means 37, a magnetic bias current i0 can be set to be continuously variable. This makes it possible, for example, to set the damping characteristics of the magnetic radial bearing 1.

A magnetic bearing system 10 according to the invention can furthermore include a position sensor, which is not shown in detail, for detecting the position of a magnetically supported rotor shaft 22 in the x- and y-directions. The magnetic bearing system 10 may also include a control unit with drive means for the three-phase controller for rotating field excitation of the magnetic radial bearing such that a position of the rotor shaft 22 can be predetermined in the x- and y-directions. The controller preferably has regulation means such that an actual value of the x- and y-directions of the rotor shaft 22 detected by the position sensor corresponds to the predeterminable nominal value.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A magnetic radial bearing comprising a plurality of electromagnets arranged in a circumferential direction around a rotating shaft, each of the electromagnets having a single coil electrically connected for generating both a magnetic bias and a rotating three-phase field, wherein opposing coils of the plurality of coils form coil pairs, with first terminals of each coil pair being connected in common to a corresponding phase of a three-phase controller for generating the rotating field, and wherein second terminals of the coils of each coil pair associated with different phases are connected at corresponding star points, with the star points connected to DC power for generating the magnetic bias.

2. The magnetic radial bearing of claim 1, wherein a number of first terminals corresponds to twice a number of the phases.

3. The magnetic radial bearing of claim 1, wherein the electromagnets are arranged in form of a rotating-field machine stator with a three-phase winding.

4. The magnetic radial bearing of claim 3, wherein the rotating-field machine stator is wound such that a number of pole pairs for generating the magnetic bias and a number of pole pairs for generating the rotating field differ by a value of 1.

5. The magnetic radial bearing of claim 3, wherein the three-phase winding has a number of holes q=2/5.

6. A magnetic bearing system comprising:
   a magnetic radial bearing having a plurality of electromagnets arranged in a circumferential direction around a magnetically supported rotor shaft, each of the electromagnets having a single coil electrically connected for generating both a magnetic bias and a rotating three-phase field;
   a three-phase controller;
   a DC power supply,
   wherein opposing coils of the plurality of coils are associated with a common phase and have each first terminals connected to a corresponding phase of the three-phase controller for generating the rotating field, and wherein second terminals of the coils that are associated with different phases are each connected in common to a corresponding terminal of the DC power supply for generating the magnetic bias.

7. The magnetic bearing system of claim 6, wherein the three-phase controller is a three-phase controller comprising an input-side DC link circuit and a downstream inverter unit, and wherein the DC link circuit operates as the DC power supply.

8. The magnetic bearing system of claim 7, wherein the DC power supply includes pulsed switching means for setting a magnetic bias current.

9. The magnetic bearing system of claim 8, wherein the pulsed switching means comprises a chopper.

10. The magnetic bearing system of claim 6, further comprising a position sensor for detecting an actual position of the magnetically supported rotor shaft in x- and y-directions, and a control unit having drive means for driving the three-phase controller so as to adjust the actual position of the rotor shaft to correspond to a predetermined nominal position of the rotor shaft in the x- and y-directions.

* * * * *